United States Patent
Byun et al.

(10) Patent No.: US 10,251,134 B2
(45) Date of Patent: Apr. 2, 2019

(54) METHOD AND APPARATUS FOR CONTROLLING TRANSMISSION POWER

(71) Applicant: LG ELECTRONICS INC., Seoul (KR)

(72) Inventors: Ilmu Byun, Seoul (KR); Hyunsoo Ko, Seoul (KR); Kungmin Park, Seoul (KR); Heejeong Cho, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 15/328,870

(22) PCT Filed: Jul. 24, 2014

(86) PCT No.: PCT/KR2014/006747
§ 371 (c)(1),
(2) Date: Jan. 24, 2017

(87) PCT Pub. No.: WO2016/024644
PCT Pub. Date: Feb. 18, 2016

(65) Prior Publication Data
US 2017/0215152 A1 Jul. 27, 2017

(51) Int. Cl.
*H04W 72/04* (2009.01)
*H04W 52/22* (2009.01)
(Continued)

(52) U.S. Cl.
CPC ............ *H04W 52/226* (2013.01); *H04B 7/02* (2013.01); *H04B 7/0617* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

| 6,453,177 | B1 | 9/2002 | Wong et al. |
| 2013/0039284 | A1* | 2/2013 | Marinier ................ H04L 5/001 370/329 |

(Continued)

FOREIGN PATENT DOCUMENTS

| JP | 2010041473 | 2/2010 |
| JP | 2010041587 | 2/2010 |

(Continued)

OTHER PUBLICATIONS

PCT International Application No. PCT/KR2014/006747, International Search Report dated Apr. 9, 2015, 2 pages.

(Continued)

*Primary Examiner* — Hassan A Phillips
*Assistant Examiner* — Prenell P Jones
(74) *Attorney, Agent, or Firm* — Lee Hong Degerman Kang & Waimey (57) ABSTRACT

Provided are a method and an apparatus for controlling transmission power to remove symbol level interference when forming differentiated beams in a wireless system. A terminal, according to the present invention, may receive, from each of M resource blocks, M reference signals, and determine a power ratio between the reference signals and data signals for each of the M reference signals, wherein the beam width for each of the M reference signals may differ depending on the index of the resource blocks, and wherein the power ratio may be determined on the basis of beam width parameters corresponding to the index of the resource blocks.

11 Claims, 9 Drawing Sheets

(51) Int. Cl.
*H04B 7/02* (2018.01)
*H04W 52/18* (2009.01)
*H04W 52/38* (2009.01)
*H04B 7/06* (2006.01)
*H04L 5/00* (2006.01)
*H04W 16/28* (2009.01)
*H04W 52/14* (2009.01)
*H04W 52/16* (2009.01)
*H04W 52/28* (2009.01)
*H04W 52/32* (2009.01)
*H04W 88/02* (2009.01)

(52) U.S. Cl.
CPC ......... *H04B 7/0619* (2013.01); *H04L 5/0048* (2013.01); *H04W 16/28* (2013.01); *H04W 52/143* (2013.01); *H04W 52/16* (2013.01); *H04W 52/18* (2013.01); *H04W 52/281* (2013.01); *H04W 52/325* (2013.01); *H04W 52/38* (2013.01); *H04W 72/042* (2013.01); *H04W 72/046* (2013.01); *H04W 72/0473* (2013.01); *H04W 88/02* (2013.01)

(56) References Cited

U.S. PATENT DOCUMENTS

2013/0069088 A1* 3/2013 Speck .................. H01L 33/385
257/88
2014/0185481 A1 7/2014 Seol et al.

FOREIGN PATENT DOCUMENTS

KR 1020110044278 4/2011
KR 1020140058976 5/2014

OTHER PUBLICATIONS

European Patent Office Application Serial No. 14899694.5, Search Report dated Jan. 4, 2018, 6 pages.

* cited by examiner

METHOD AND APPARATUS FOR CONTROLLING TRANSMISSION POWER

CROSS-REFERENCE TO RELATED APPLICATIONS

This application is the National Stage filing under 35 U.S.C. 371 of International Application No. PCT/KR2014/006747, filed on Jul. 24, 2014, the contents of which are incorporated by reference herein in its entirety.

BACKGROUND OF THE INVENTION

Field of the Invention

The present invention relates to a method and apparatus for controlling transmit power, and more particularly, to a method and apparatus for controlling transmit power for a reference signal which is beamformed with a different beam width.

Related Art

Recently, commercialization of a long term evolution (LTE) system which is a next-generation wireless communication system has been supported earnestly. After recognizing necessity for supporting not only a voice service but also a large amount service with high quality in response to a user's demand while ensuring activity of a user of a terminal, the LTE system tends to be more rapidly increased than before. The LTE system provides a low transmission delay, a high transfer rate, and an improved system capacity and coverage.

With an introduction of such a high-quality service, there is a rapidly growing demand on a wireless communication service. Above all, capacity of a communication system must be increased to actively cope with this situation. A method of newly discovering an available frequency band and a method of increasing efficiency for a limited resource may be considered as an alternative of increasing communication capacity in a wireless communication environment.

As the method of increasing the efficiency for the limited resource, a so-called multi-antenna transmission/reception technique is actively developed in recent years with a remarkable attention, in which a spatial region for resource utilization is additionally ensured by placing a plurality of antennas to a transceiver to obtain a diversity gain or in which transmission capacity is increased by transmitting data in parallel through the respective antennas.

In a multi-antenna system, beamforming and precoding may be used as a method of increasing a signal to noise ratio (SNR). The beamforming and the precoding are used to maximize the SNR through feedback information in a closed-loop system capable of using the feedback information in a transmitting end.

SUMMARY OF THE INVENTION

The present invention proposes a reference signal arrangement and power control method for effectively performing symbol level interference cancellation by a terminal when differential beamforming is applied between cells.

According to an embodiment of the present invention, a method for processing a reference signal of a terminal includes: receiving M reference signals respectively from M resource blocks; and determining a power ratio of a reference signal to a data signal for each of the M reference signals, wherein a beam width for each of the M reference signals varies depending on an index of the resource block, and the power ratio is determined on the basis of a beam width parameter corresponding to the index of the resource block.

The power ratio may be determined on the basis of a table for an antenna gain corresponding to the beam width parameter.

If a transmit power ratio of a reference signal corresponding to a minimum beam width parameter to a data signal is $\alpha$, an antenna gain for a resource block corresponding to the minimum beam width parameter is $G(W_M, \theta)$, and an antenna gain for a resource block corresponding to an m-th beam width parameter is $G(W_m, \theta)$, then a transmit power ratio $\alpha_m$ of a reference signal corresponding to the m-th beam width parameter to a data signal may be expressed by Equation 1:

$$\alpha_m = \alpha * (G(W_M, \theta))^2 / (G(W_m, \theta))^2, \quad \text{<Equation 1>}$$

where $W_m$ is a beam forming vector of a resource block corresponding to an m-th ($1 \leq m \leq M$) beam width, and where $\theta$ is a horizontal steering angle between the terminal and the base station.

If M is 2, an information bit may be included in a first resource block having a width beam width, and a parity bit may be included in a second resource block having a narrower beam width than the first resource block.

The method may further include receiving the beam width parameter from the base station.

The method may further include receiving information regarding the table from the base station.

According to another embodiment of the present invention, a terminal may include: a radio frequency (RF) unit for receiving M reference signals respectively from M resource blocks; and a processor for determining a power ratio of a reference signal to a data signal for each of the M reference signals, wherein a beam width for each of the M reference signals varies depending on an index of the resource block, and the power ratio is determined on the basis of a beam width parameter corresponding to the index of the resource block.

According to another embodiment of the present invention, a method of controlling power of a reference signal includes: transmitting M reference signals to M resource blocks; and compensating for transmit power of the reference signal by considering an antenna horizontal steering angle with respect to a terminal for receiving the reference signal, wherein a beam width for each of the M reference signals varies depending on an index of the resource block, and a power ratio of a reference signal to a data signal for each of the M reference signals is determined on the basis of a beam width parameter corresponding to the index of the resource block.

If transmit power of a reference signal corresponding to a minimum beam width parameter is $P_{T(M)}$, an antenna gain for a resource block corresponding to a minimum beam width parameter is $G(W_M, \theta)$, and an antenna gain for a resource block corresponding to an m-th ($1 \leq m \leq M$) beam width parameter is $G(W_m, \theta)$, then transmit power of an m-th reference signal may be expressed by Equation 2:

$$P_T(m) = P_T(M) * G(W_M, \theta) / G(W_m, \theta), \quad \text{<Equation 2>}$$

where $W_m$ is a beam forming vector of a resource block corresponding to an m-th ($1 \leq m \leq M$) beam width, and where $\theta$ is a horizontal steering angle between the terminal and a base station.

The power ratio may be determined on the basis of a table for an antenna gain corresponding to the beam width parameter.

According to an embodiment of the present invention, provided is a reference signal arrangement and power control method for effectively performing symbol level interference cancellation by a terminal when differential beamforming is applied between cells.

In addition, according to an embodiment of the present invention, provided is a reference signal processing method of a terminal capable of determining a power ratio of a reference signal corresponding to a beam width to a data signal when differential beamforming is performed on a plurality of beams.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

The present specification is described based on a communication network. A task achieved in the communication network may be achieved in a process of controlling a network and transmitting data in a system (e.g., a base station) for managing the communication network, or the task may be achieved in a terminal linked to the network.

Figure 1:
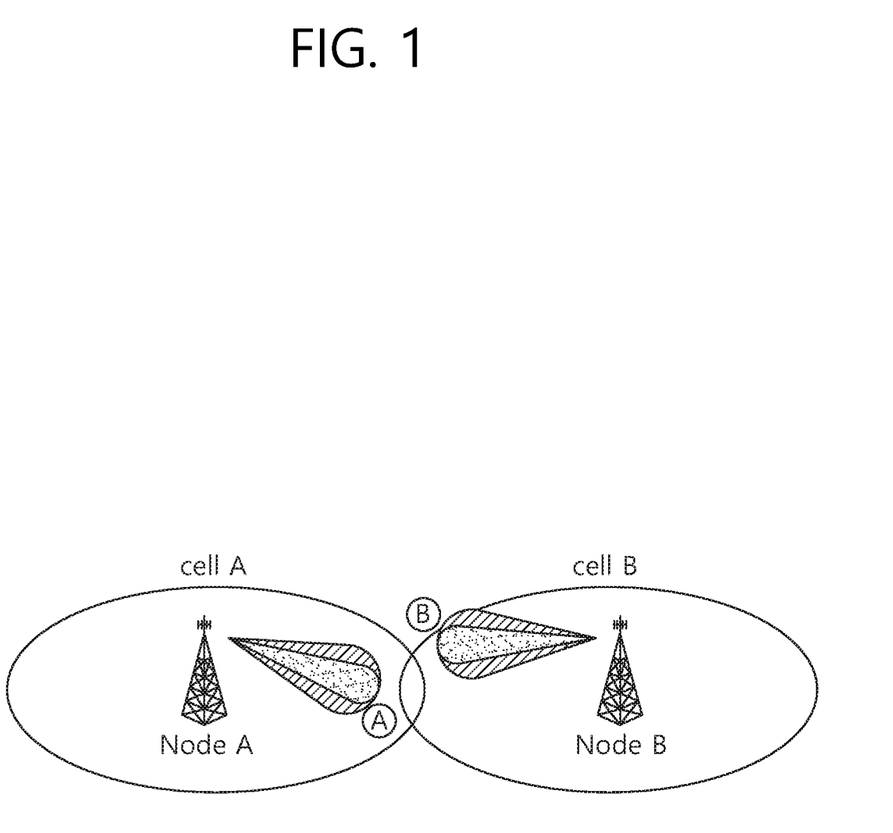
FIG. 1 is a drawing for describing differential beamforming according to an embodiment of the present invention.

FIG. 1 is a drawing for describing differential beamforming according to an embodiment of the present invention.

It is assumed that a base station A manages a cell A, a base station B manages a cell B, a terminal A receives a signal transmitted from the base station A, and a terminal B receives a signal transmitted from the base station B.

The base station A and the base station B may widely apply beamforming to important information to be always received by the terminal, and information to be additionally transmitted may narrow a width of beamforming step-by-step according to an importance. That is, a priority may be assigned according to an importance of a signal to be transmitted, and a beam width may be adjusted according to the priority.

That is, according to the present invention, a priority is assigned on the basis of an importance of data, and a signal having a different priority has a different beam width. The higher the priority, the wider the beam width. The lower the priority, the narrower the beam width.

According to one example, as shown in FIG. 1, beams may have two priorities. A beam having a first priority may be formed to be wide, and a beam having a second priority may be formed to be narrower. Signals having different priorities may be allocated to orthogonal resources.

According to one embodiment of the present invention, in a channel code in which encoding data includes input data, a high priority may be assigned to an information bit, and a low priority may be assigned to a parity bit. The channel code is characterized in that a signal can be restored by using only the information bit, and a rate-compatible code can be easily generated by adjusting a length of the parity bit. In general, the information bit is more important than the parity bit in the channel code. A case where deterioration occurs while the information bit passes through a channel exhibits worse performance than a case where deterioration occurs while the parity bit passes through a channel.

Accordingly, a first priority may be assigned to the information bit which is more important information, and a second priority may be assigned to the parity bit. A beam width for a signal for the information bit may be formed by a base station to be wider than a beam width of a signal for the parity bit.

According to another embodiment of the present invention, differential beamforming may also be applied to a hierarchical video coding signal. In case of video coding including a plurality of layers, information for a base layer which is the most basic information is most important. In an enhancement layer in which coding can be achieved on the basis of the base layer, reception or decoding cannot be normally achieved when the information for the base layer is lost or deteriorates.

In video coding to which different scalabilities such as temporal scalability, spatial scalability, quality scalability, etc., are applied, a first priority which is the highest priority may be assigned to the base layer to apply the widest beamforming thereto, and as to a higher layer, a low priority may be assigned to an enhancement layer, thereby decreasing a beam width.

In addition to the aforementioned example, a beam priority may be assigned variously according to a data type and an importance. The priority may be assigned according to audio and video signals.

When differential beamforming is applied as described above according to an information importance, even if a terminal moves or channel information contained in a base station is incorrect, the terminal can receive core information. Further, if the channel information of the base station is correct, the terminal can decode an additional signal by receiving additional information, thereby improving reliability, accuracy, quality, or the like of reception information.

As shown in FIG. 1, in a cell edge region in which the cell A and the cell B are adjacent, interference may occur between a beam transmitted from the base station A and a beam transmitted from the base station B. In this case, the base station A and the base station B may allocate signals having different priorities to a border region of the cells so that an interference signal can be cancelled by the terminal A and the terminal B.

If the base station A for managing the cell A allocates a high-priority signal to a specific resource, the base station B for managing the neighboring cell B may allocate a low-priority signal to the resource. For example, if the base station A and the base station B can transmit signals with priorities 1 to N, signals allocated to a resource to which the priority 1 is assigned for the terminal A may be allocated for the terminal B in a reverse order starting from the priority N.

Figure 2A:
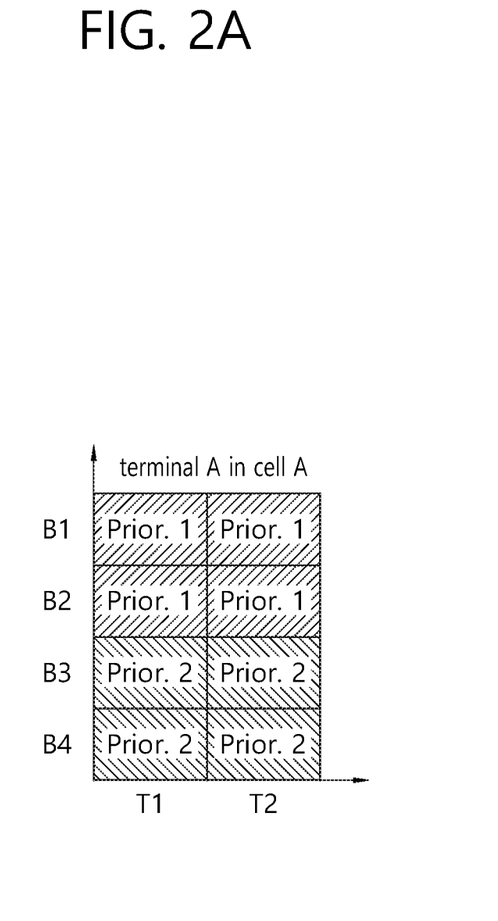
FIG. 2a is a drawing for illustrating a resource allocated to a terminal A of a cell A according to an embodiment of the present invention.
Figure 2B:
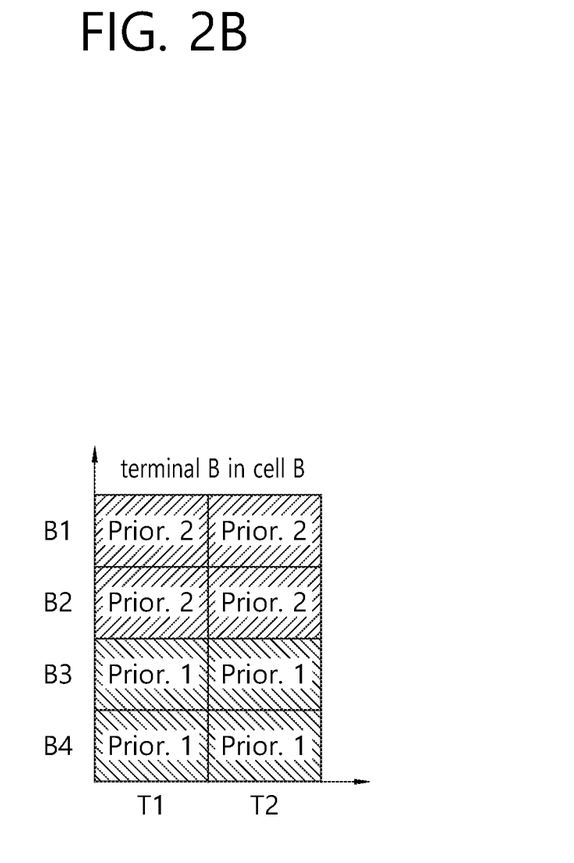
FIG. 2b is a drawing for illustrating a resource allocated to a terminal B of a cell B according to an embodiment of the present invention.

FIG. 2a is a drawing for illustrating a resource allocated to a terminal A of a cell A according to an embodiment of the present invention, and FIG. 2b is a drawing for illustrating a resource allocated to a terminal B of a cell B according to an embodiment of the present invention.

As shown, a base station A may allocate signals having two priorities, i.e., a first priority and a second priority, to a band region on a time axis. In this case, a base station B allocates a signal having a second priority for the terminal B to a resource to which a signal having a first priority is allocated for the terminal A, and on the contrary, allocates a signal having a first priority for the terminal B to a resource to which a signal having a second priority is allocated for the terminal A. That is, the base station A and the base station B allocate signals having different priorities to the same resource. As described above, the signals having the different priorities have different beam widths, which implies differential beamforming.

If the different beamforming is performed, a probability that a signal of the terminal A is interfered by a signal of the terminal B is decreased.

Alternatively, even if the signal having the first priority is interfered by the signal having the second priority, strong interference occurs since the signal having the second priority has a narrow beam width. If an interference signal is strong, it is easy to cancel a signal of the terminal B when the terminal A knows a reference signal of the terminal B. Alternatively, if the terminal A receives a low-priority signal, this is advantageous for signal restoration since receive power of the signal is greater than a high-priority interference signal delivered from the base station B.

Meanwhile, the first-priority signal and second-priority signal transmitted from the terminal A or the terminal B may have different coverage. For example, in this case, the first-priority signal may cover a wider region but has a short communication range, whereas the second-priority signal may cover a narrower region than the first-priority signal but may have a longer communication range. In this case, although the second-priority signal can be communicated up to a distance to which the first-priority signal cannot be communicated, if the first-priority signal cannot be communicated, decoding of the second-priority signal is meaningless.

For example, if information regarding a basic layer which is the most important information in a video signal supporting scalability cannot be received, an enhanced layer cannot be properly decoded even if information on the enhanced layer is received. Therefore, in this case, a proper power control is required for a reference signal.

It is assumed as shown in FIG. 1 that the base station A and the base station B perform differential beamforming on the terminal A and the terminal B. The base station A and the base station B may allocate a resource block (RB) constructed of a plurality of resource elements (REs) as a resource for the cell A and the cell B, and differential beamforming may be performed in which a beam width is different for each RB.

A plurality of reference signals (RSs) for channel estimation are arranged to one resource, and the present invention provides a method of controlling power of the RS so that the RS for a beam having a plurality of priorities can be communicated with the terminal. The RS is transmitted by being amplified by a specific multiple, for example, X times, of a typical data signal.

Hereinafter, for convenience of explanation, a case where the base station A provides M beams to the terminal A is described. The following description is equally applicable to the base station B for forming a beam of which a beam width is different and the terminal B for receiving a beam formed in the base station B.

The base station A may allocate M RBs to the terminal A, and may perform differential beamforming in which a beam width is different for each RB. In the present invention, the RB implies a unit of any radio resource allocation used in transmission of an RS having a different beam width. A beam width may be different for each RB, and a beam width for each RS may be different depending on an index of the RB. That is, according to the present invention, the index of the RB may be one-to-one correspondent to a beam width parameter capable of specifying a beam width.

A different beam width may be implemented by applying a different pre-coder, for example, a different beamforming vector.

In case of performing the differential beamforming, in order to equally maintain a communication range of an RS in a different RB, the base station A may decrease a value X indicating a power amplification ratio when a beam width is narrow.

In other words, the base station A may decrease signal strength of an RS having a long communication range since a beam width is narrow, and may increase signal strength of an RS having a short communication range since a beam width is wide as much as a signal magnitude decreased in response thereto. Accordingly, the terminal A may reliably receive an RS for a beam having a plurality of beam widths, and may equally maintain a signal to noise ratio (SNR) of RSs in different RBs. Since a power ratio X is one-to-one correspondent to a pre-coder for adjusting a beam width, if X corresponding to one RB is recognized and the same pre-coder is also used in different RBs, the terminal A may also recognize X for a different RB.

If a beam width is wide, a beam is formed to a wide region, and thus even if the terminal moves, the terminal may receive the beam. Accordingly, as described above, important information may be allocated to an RB having a wide beam width. For example, an RB having a wide beam width may include an information bit or may include the information bit and a parity bit, and an RB having a relatively narrow beam width may include only the parity bit. As described above, since the terminal A can reliably receive an RS for a beam having a plurality of beam widths, the information bit and the parity bit can be reliably received to decode a signal.

A beamforming vector of an RB corresponding to an m-th beam width among M beams may be denoted by $W_m$, and an antenna gain corresponding to an m-th RB may be denoted by $G(W_m,\theta)$. Herein, m is in the range of 1 to M, and $\theta$ denotes a horizontal steering angle between the terminal A and the base station A.

It is assumed that the terminal A is in a direction in which an angle $\theta$ with respect to the base station A is 0, and a beam width is constant or decreased when m is increased. In this case, transmit power $P_{T(m)}$ of an RS allocated to an RB having an m-th beam width may be expressed by Equation 1 below.

$$P_T(m)=P_T(M)*G(W_M,\theta)/G(W_m,\theta) \qquad \text{<Equation 1>}$$

Since a beam width is decreased when m is increased, transmit power $P_{T(M)}$ of an RS corresponding to a minimum beam width corresponds to maximum transmit power among m RBs, and an antenna gain also has a maximum value of $G(W_M,\theta)$ which is an antenna gain of an RS corresponding to a minimum beam width.

In summary, according to the present embodiment, the base station A adjusts transmit power of an RS in unit of beamforming or in unit of resource allocation for applying different precoding to adjust a communication range of the RS.

Meanwhile, in order to estimate a channel by using an RS or to utilize information of the estimated channel in demodulation, the terminal A must know a transmit power ratio of the RS to a data signal.

If all magnitudes of power used in transmission of the data signal are identical in a plurality of RBs and if transmit power of an RS for an m-th RB is $\alpha$ times of transmit power of data, a transmit power ratio $\alpha_m$ of the RS for the m-th RB to the data signal may be expressed by Equation 2.

$$\alpha_m=\alpha*(G(W_M,\theta))^2/(G(W_m,\theta))^2 \qquad \text{<Equation 2>}$$

That is, for the transmit power ratio a of the RB corresponding to the minimum beam width, the transmit power ratio $\alpha_m$ of the m-th RB may be determined according to a squared ratio of an antenna gain based on a beamforming vector of an RB corresponding to a minimum beam width and an antenna gain based on a beamforming vector of the m-th RB.

Only when the terminal A knows in advance the antenna gain based on the beamforming vector as table information or knows table information of a transmit power ratio $\alpha_m$ based on a combination of beamforming vectors, the transmit power ratio $\alpha_m$ may be used in channel estimation.

According to one embodiment of the present invention, the terminal A may determine the transmit power ratio $\alpha_m$ by using Table 1 indicating the antenna gain for the beamforming vector.

TABLE 1

| m | $G(W_m, \theta)$ |
|---|---|
| 1 | 1.12 |
| 2 | 1.58 |
| . | . |
| . | . |
| . | . |
| P | 2.8 |

In Table 1, m is a beam width parameter capable of identifying a different beam width, and the beam width parameter may be one-to-one correspondent to an index of an RB.

The terminal A may recognize the beam width parameter by recognizing the index of the RB, and may receive index information indicating a specific beam width parameter from the base station A. Information shown in Table 1 for the antenna gain corresponding to the beam width parameter may be received from the base station A when differential beamforming is performed, and may be information configured in advance with an agreement between the terminal A and the base station A and stored in the terminal A.

Meanwhile, Table 1 shows an antenna gain when $\theta$ is 0. Although a horizontal steering angle between the base station and the terminal may have various values in practice, a magnitude ratio of a reception signal for a beam having a different beam width may be maintained in a relatively constant manner in the same horizontal steering angle. Accordingly, an antenna gain table may be configured as shown in Table 1 by considering only a case of $\theta=0$.

Figure 3:
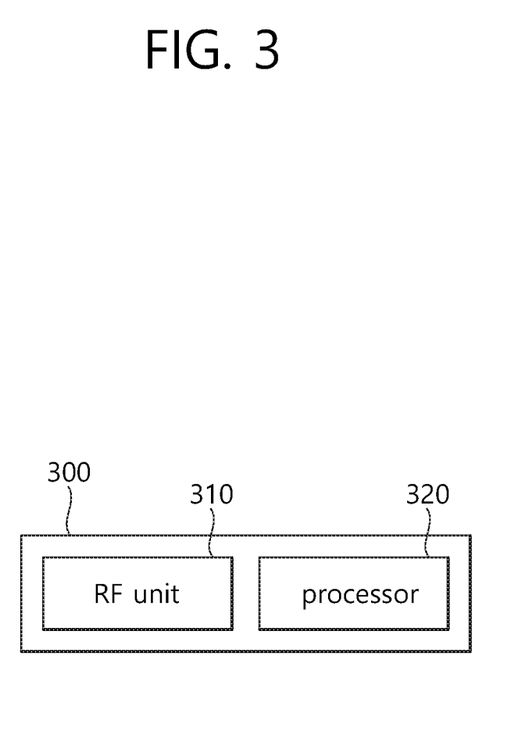
FIG. 3 is a block diagram of a terminal according to an embodiment of the present invention.
Figure 4:
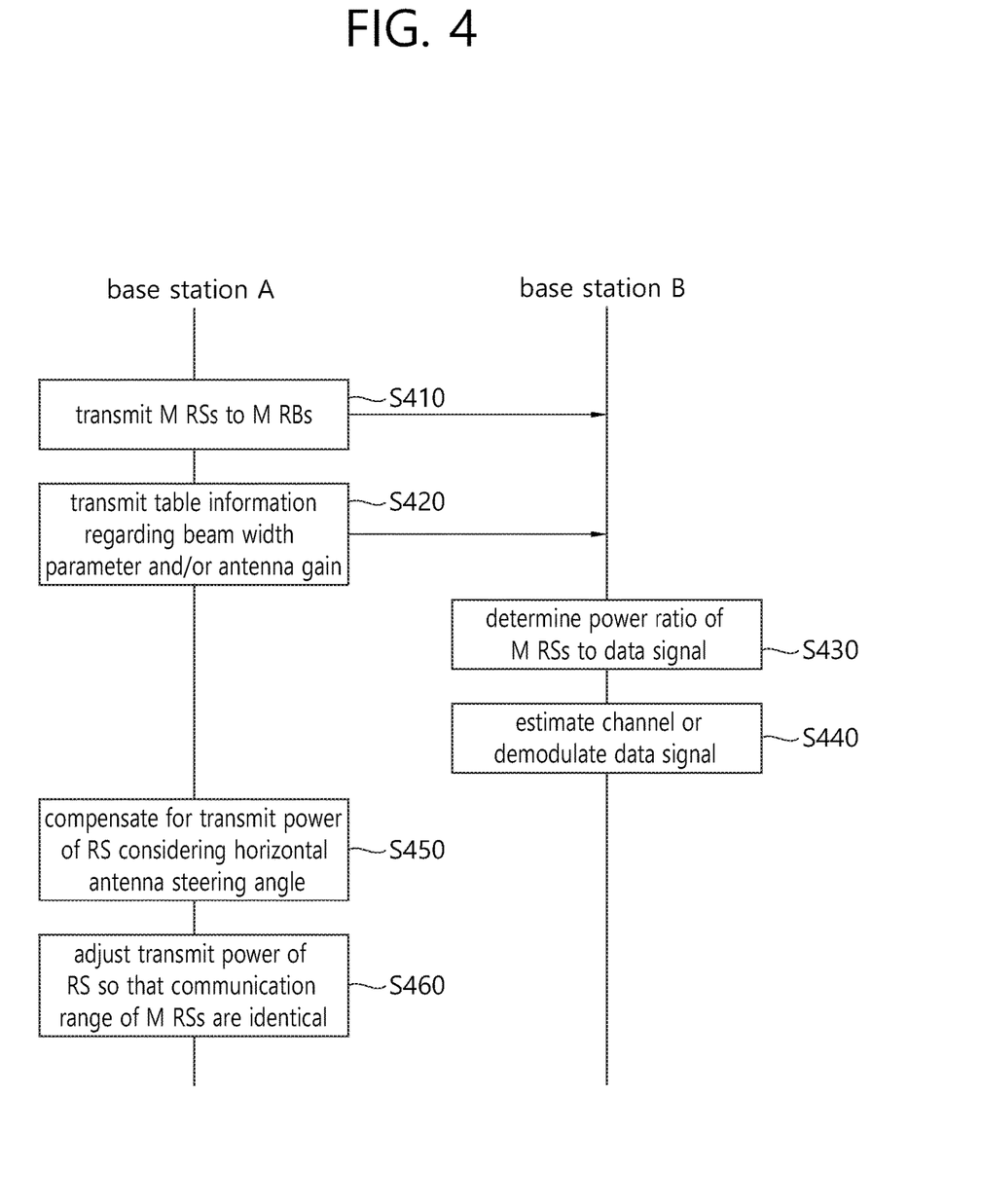
FIG. 4 is a flowchart for describing a reference signal processing method of a terminal according to an embodiment of the present invention.

In this case, a magnitude of a reception signal may be erroneous between different beamforming vectors according to $\theta$. The error may be compensated for in a base station side. That is, if the terminal A is located in a place where $\theta$ is not 0, an RS may be transmitted with transmit power used to compensate for the error FIG. 3 is a block diagram of a terminal according to an embodiment of the present invention, and FIG. 4 is a flowchart for describing an RS processing method of a terminal according to an embodiment of the present invention. Referring to FIG. 3 and FIG. 4, an RS processing method according to the present embodiment is summarized as follows. For convenience of explanation, the following description is based on a base station A and a terminal A.

Referring to FIG. 3, a terminal A 300 includes an RF unit 310 and a processor 320.

The RF unit 310 receives M RSs respectively from M RBs. The processor 320 coupled to the RF unit 310 determines a power ratio of an RS to a data signal for each of the M RSs.

Further, the processor 320 may estimate a channel by using the determined power ratio, and may demodulate the received data signal.

As shown in FIG. 4, the base station A transmits the M RSs on the M RBs to the terminal A (S410).

According to the present embodiment, a beam width for each of the M RSs may vary depending on an index of the RB. That is, the base station A performs differential beamforming in which a beam width is different for each of the M RBs.

The power ratio of the RS to the data signal for each of the M RSs may be determined on the basis of a beam width parameter corresponding to the index of the RB. That is, the power ratio of the RS to the data signal may be determined on the basis of a specific beam width parameter for determining a beam width. According to the present embodiment, the beam width parameter may vary depending on an RB index for identifying an RB.

Meanwhile, the power ratio may be determined on the basis of a table for an antenna gain corresponding to the beam width parameter. For example, the table for the antenna gain corresponding to the beam width parameter may be Table 1.

The base station A may transmit information regarding the beam width parameter and information regarding the table for the antenna gain to the terminal A (S420).

If the terminal A can recognize the RB index in a process of receiving and decoding the RS, that is, if information capable of inferring the beam width parameter is recognized, the information regarding the beam width parameter may not be additionally transmitted to the terminal A. Further, if information regarding the table for the antenna gain is already shared between the base station A and the terminal A, the information regarding the table may not be transmitted to the terminal A.

That is, step S420 may be omitted according to an embodiment.

The terminal A may determine the power ratio of the RS to the data signal for each of the received M RSs (S430).

The terminal A may determine the power ratio on the basis of a beam width parameter corresponding to the RB index as described above. The power ratio may be derived according to an antenna gain corresponding to the beam width parameter.

If a table as shown in Table 1 is not utilized, the terminal A must individually receive an RB having a different beam width, that is, power ratio information regarding the M RSs, from the base station A. According to the present embodiment, when the individual power ratio is transmitted, there is an advantage in that the information regarding the power ratio may be transmitted by using a much simpler signal.

The terminal A may estimate a channel according to the determined M power ratios, or may decode the data signal (S440).

Although a horizontal steering angle between the base station A and the terminal A may have various values other than 0 in practice, since a magnitude ratio of a reception signal between beams having different beam widths in the same horizontal steering angle can be constantly maintained, an antenna gain corresponding to a beam width parameter as shown in Table 1 may be considered only when a horizontal steering angle θ is 0.

In this case, the base station A can compensate for the magnitude of the reception signal between the different beamforming vectors generated according to θ (S450). That is, the base station A may compensate for transmit power of an RS by considering an antenna horizontal steering angle.

Further, the base station A may adjust transmit power of M RSs such that the M RSs have the same communication range (S460).

According to one embodiment, it may be assumed that transmit power of an RS corresponding to a minimum beam width parameter is $P_{T(M)}$, an antenna gain for an RB corresponding to a minimum beam width parameter is $G(W_M, \theta)$, and an antenna gain for an RB corresponding to an m-th (1≤m≤M) beam width parameter is $G(W_m, \theta)$. In this case, transmit power of an m-th RS may be $P_{T(m)} = P_{T(M)} * G(W_M, \theta)/G(W_m, \theta)$.

According to a movement of the terminal A or a feedback signal received from the terminal A, the base station A may compensate for or adjust the transmit power of the RS (step S450 and step S460). Therefore, step S450 and step S460 may be achieved together when the base station A transmits the M RSs to the terminal A, or may be performed prior to step S410 or simultaneously with step S410. That is, step S450 and S460 are not limited to the order shown in FIG. 4.

Meanwhile, as shown in FIG. 1, a beam formed to have a narrow width has a narrow area in which a signal is communicated but has a long communication range, whereas a beam formed to have a wide width has a wide area in which a signal is communicated but has a short communication range. In case of applying differential beamforming, since beam widths of the terminal A and the terminal B are controlled differently as shown in FIG. 1, an RS which exists in an RB having a first priority and is received in the terminal A may be severely damaged by a signal transmitted to the terminal B.

If the RS is a demodulated reference signal (DMRS), that is, if a channel is estimated by using the DMRS, a gain of the RS may also be increased when a gain of a beam is increased by pre-coding. If a DMRS of the base station B in the cell B is greater than a DMRS of the base station A in the cell A, the terminal A may have a difficulty in signal estimation.

Accordingly, the present invention proposes an RS arrangement and power control method for allowing a terminal to effectively perform symbol level interference cancellation when differential beamforming is applied between cells.

According to the present invention, the terminal may perform the symbol level interference cancellation after determining whether to perform the interference cancellation with additional information transmitted by the base station. Further, the symbol level interference cancellation is possible even if a subframe number of an interference signal is unknown.

First, it is assumed that two cells which use the same resource are present, resources of the cell A and the cell B are constructed in unit of resource block (RB), and one RB is constructed of M resource elements (REs). Further, N RSs may be arranged respectively to N REs in one RB for channel estimation.

If it is assumed that the base station A of the cell A transmits to the terminal A a beam formed to have a wide width, and the base station B of the cell B transmits to the terminal B a beam formed to have a narrow width, the terminal A may perform interference cancellation on the narrow beam formed in the base station B.

It is assumed that the terminal A can be synchronized with an interference signal through a primary synchronization signal (PSS) and a secondary synchronization signal (SSS) of the interference signal, and the terminal A knows a cell ID through the PSS and the SSS. As described above, the terminal A may know or may not know the subframe number of the interference signal.

According to the present invention, the base station A and the base station B may allocate an RS on the basis of a specific resource allocation frame so that the terminal A can easily perform symbol level interference cancellation.

The base station A does not transmit a signal on Z (1≤Z≤N) REs among N REs on which the base station B transmits an RS. This is described from a perspective of the base station B such that the base station B arranges Z RSs to an RE on which the base station A does not transmit an RS, and may arrange N-Z RSs to an RE on which the base station A transmits the RS.

The base station B must allocate an RS to one or more REs among REs on which the base station A does not transmit a signal, so that the terminal A can determine whether interference exists.

The RS of the base station B is transmitted with transmit power Xn times greater than a normal data signal. That is, transmit power (RB) of an RS allocated to an RE on which the base station A does not transmit a signal has transmit power amplified by Xn times of the data signal. n is in the range of 1≤n≤N.

Transmit power of an RS allocated to an RE on which the base station A transmits a signal is decreased by 1/Yn times of another RS. That is, transmit power (RB, n) of N-Z RSs arranged to the same RE so as to overlap with the RS of the base station A may be 1/Yn times of the RB, and may be expressed by RB, n=RB/Yn. Yn may be in the range of 1≤Yn≤∞. If Yn is ∞, this means that an RS is not transmitted on a corresponding RE.

Since a signal generated in the base station B has a narrow width and great strength, there is a high probability that a magnitude of an interference signal transmitted in the base station B is greater than a signal which must be received by the terminal A. Therefore, the terminal A needs to acquire information regarding whether an interference signal exists and a magnitude thereof from the base station B. For this, the base station A does not transmit a signal on a specific RE. The terminal A may receive a signal allocated in the base station B on a corresponding RE on which the base station A does not transmit a signal, and may recognize whether an interference signal exists and a magnitude of the interference signal through a magnitude of a corresponding signal.

Further, in order to solve a problem in that the terminal A has a difficulty in receiving an RS of the base station A since a signal of the base station B is formed to have a narrow beam width and thus has a long communication range, if the base station B transmits an RS on an RE on which the RS of the terminal A is transmitted, the base station B may decrease a magnitude of the RS. Accordingly, the terminal A may reliably recover channel information of a signal received from the base station A.

The terminal A and the terminal B may predetermine the number Z of RSs allocated to an RB and an RS arrangement, that is, a resource allocation frame. Further, mapping of a RB arrangement pattern and a modulation scheme, that is, a modulation order, may also be predetermined. The terminal A may recognize Xn and Yn by utilizing an RS arrangement pattern and a modulation order of an interference signal.

Since the terminal A can recognize a modulation scheme through the RS arrangement pattern of the base station B, the base station B does not have to decode information regarding a control channel to be transmitted to the terminal B. Accordingly, the terminal A can perform symbol level interference cancellation even if a boundary synchronization is not matched in a transmission time interval (TTI) which is a time required to transmit one subframe.

Further, there is an advantage in that the terminal A can perform the interference cancellation even if RBs allocated to the terminal A are interfered from signals each having a different modulation scheme. If a differential beamforming adaptive modulation and coding (AMC) scheme is applied as a modulation scheme, the terminal A may know a modulation scheme of a wide beam to be transmitted by the base station B to the terminal B from modulation scheme information of a narrow-width beam transmitted by the base station B.

FIG. 5 to FIG. 8 are drawings for illustrating an RS arrangement in an RB according to various embodiments of the present invention.

For example, if 84 REs constitute one RB, and an RS is received through 4 REs, an RS arrangement may be achieved as shown in FIG. 5 to FIG. 8. In FIG. 5 to FIG. 8, it is shown a case of RB, n=RB/Yn, where Yn is ∞.

Figure 5:
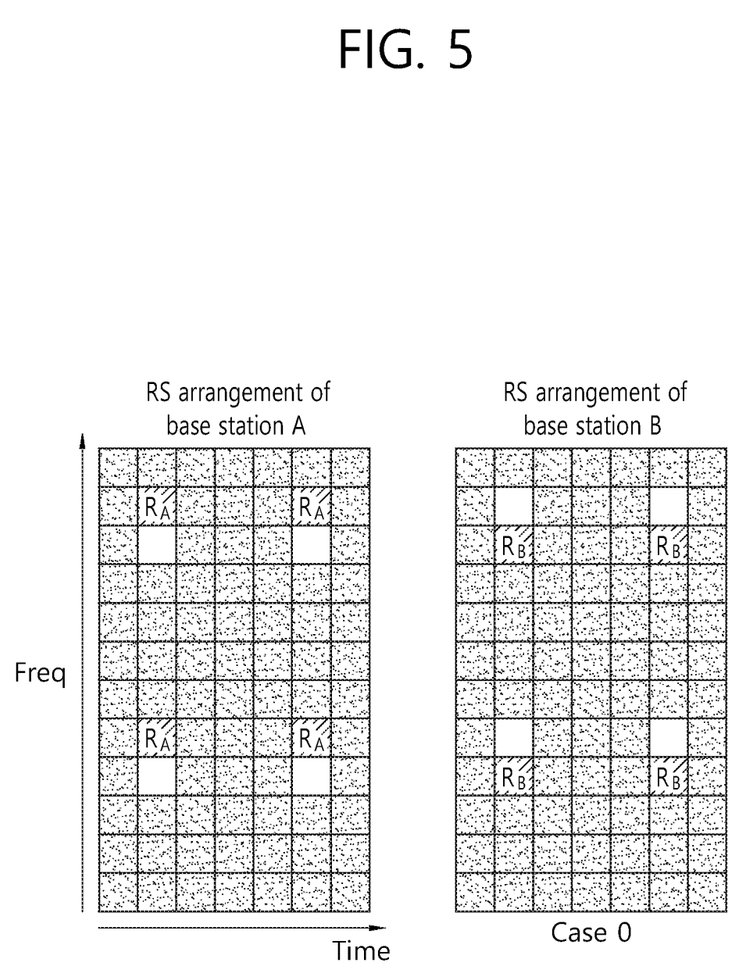
FIG. 5 is a drawing for illustrating a reference signal arrangement in a resource block according to an embodiment of the present invention.

According to an embodiment of FIG. 5, a base station A and a base station B do not arrange respective RS s to the same RE. That is, the base station A arranges an RS to an RE on which the base station B does not arrange an RS, and the base station B also arranges an RS to an RE on which the base station A does not arrange an RS. In this case, Z is 4.

Figure 6:
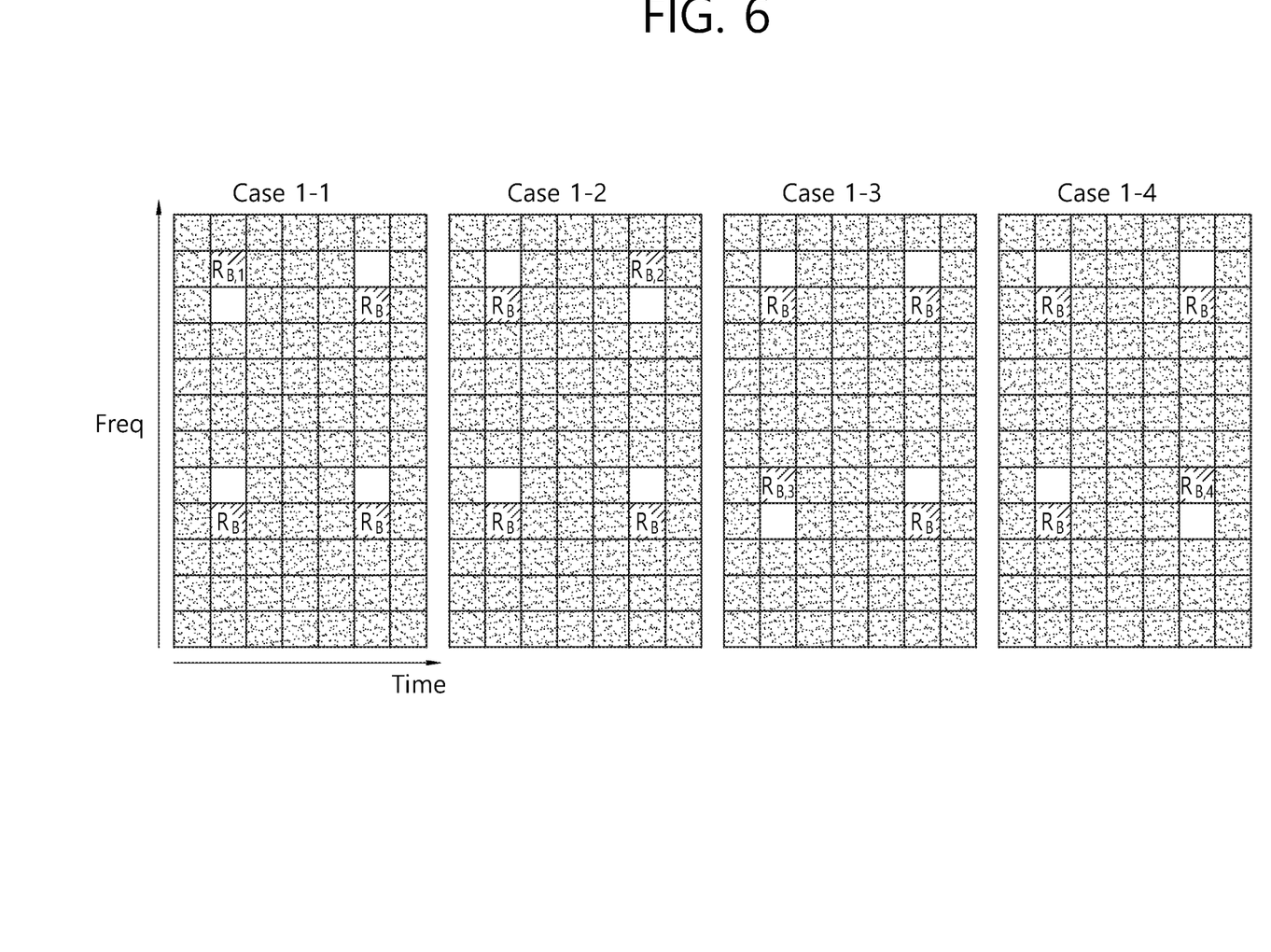
FIG. 6 is a drawing for illustrating a reference signal arrangement in a resource block according to another embodiment of the present invention.
Figure 7:
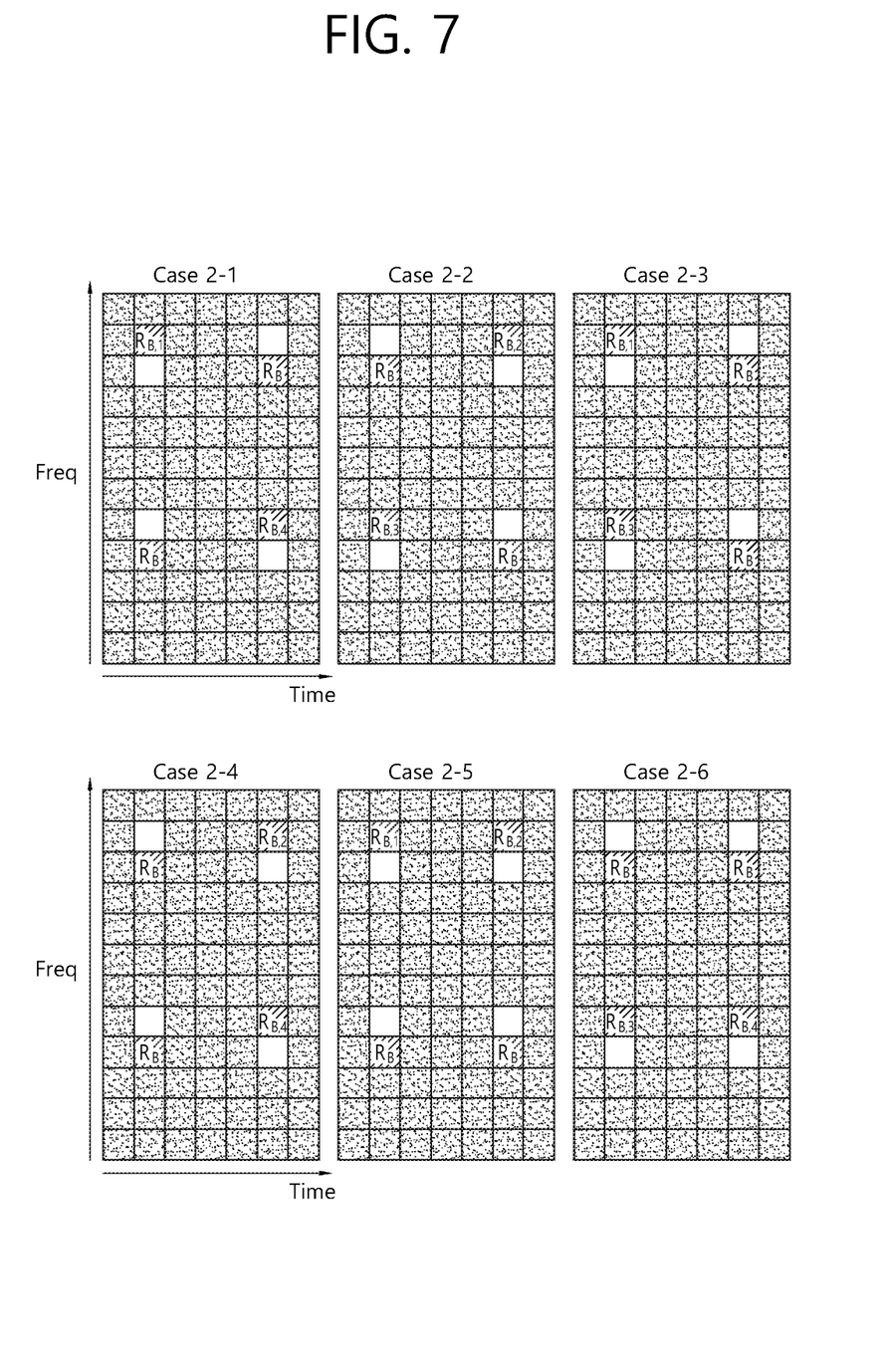
FIG. 7 is a drawing for illustrating a reference signal arrangement in a resource block according to another embodiment of the present invention.
Figure 8:
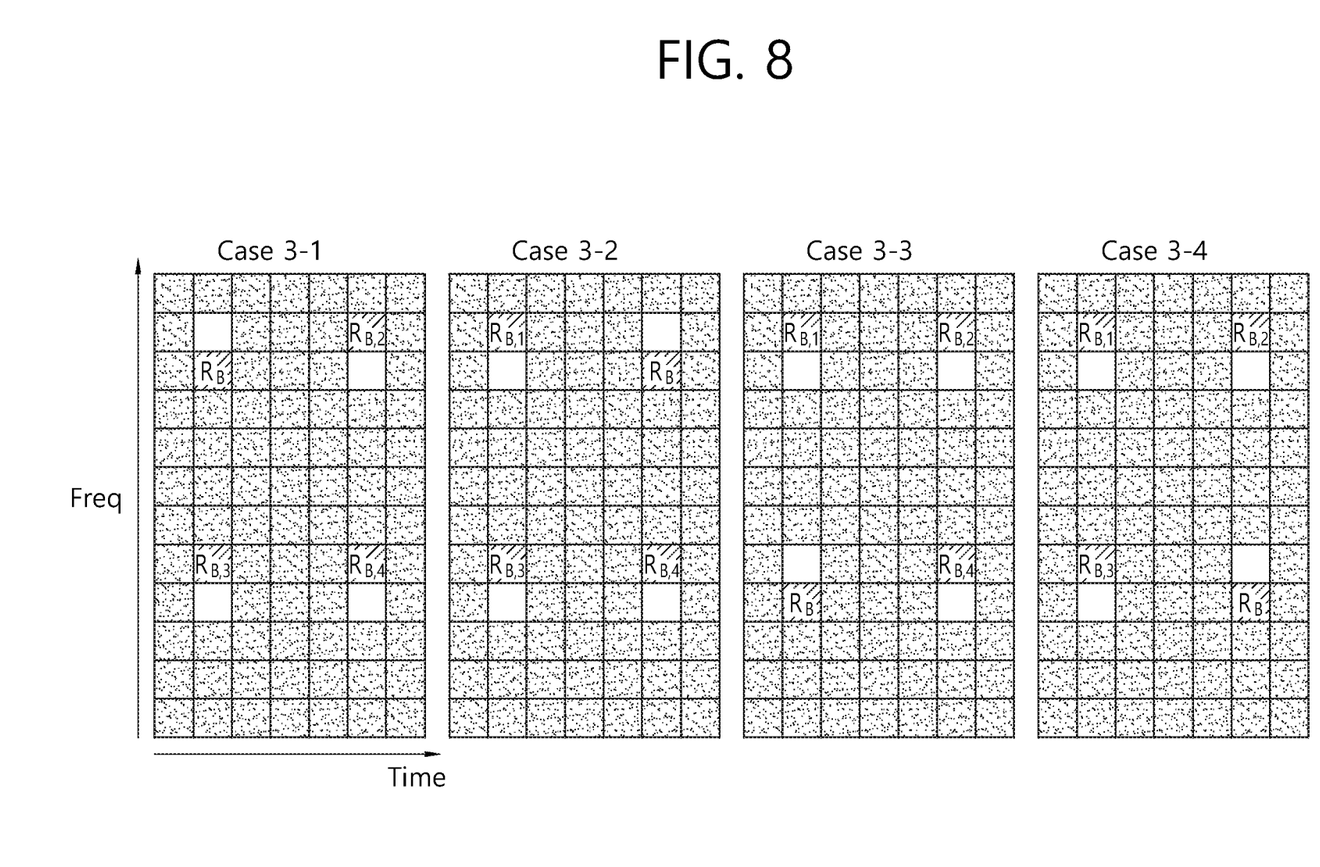
FIG. 8 is a drawing for illustrating a reference signal arrangement in a resource block according to another embodiment of the present invention.

FIG. 6 to FIG. 8 are drawings illustrating an RS arrangement of a base station B under the assumption that an RS arrangement of a base station A is the same as FIG. 4.

Referring to FIG. 6, the base station B arranges an RS to three REs on which the base station A does not transmit a signal. That is, the base station A and the base station B arrange an RS such that the RS overlaps in one RE.

In an embodiment of FIG. 7, the base station B may arrange an RS to two REs on which the base station A does not transmit a signal. In an embodiment of FIG. 8, the base station B may arrange an RS to one RE on which the base station A does not transmit a signal.

As described above, the resource arrangement of FIG. 5 to FIG. 8 may be mapped to any modulation scheme. For example, in FIG. 5, a resource arrangement (Case 0) may be mapped to 256QAM. In FIG. 6, a first resource arrangement (Case 1-1) may be mapped to 64QAM, a second resource arrangement (Case 1-2) may be mapped to 16QAM, and a third resource arrangement (Case 1-3) may be mapped to QPSK.

According to another embodiment, in FIG. 5, a resource arrangement may be mapped to 256QAM. In FIG. 6, a first resource arrangement (Case 1-1) may be mapped to 64QAM. In FIG. 7, a first resource arrangement (Case 2-1) may be mapped to 16QAM. In FIG. 8, a first resource arrangement (Case 3-1) may be mapped to QPSK.

Meanwhile, if the base station B transmits an RS by using two or more RBs, a modulation order and Yn may be reported through an RS arrangement of all RBs. For example, if the base station B transmits a signal through two RBs, (Case 0, Case 0) may be mapped to 256QAM, (Case 1-1, Case 0) may be mapped to 64QAM, (Case 0, Case 1-1) may be mapped to 16QAM, and (Case 1-1, Case 1-1) may be mapped to QPSK.

According to another embodiment, if the base station B transmits a signal by using two or more RBs, a modulation order may be reported through an RS arrangement of one RB, and Yn may be reported through an RS arrangement of the remaining RBs. For example, if the base station B transmits a signal on two RBs, (Case 0, Case 0) may be mapped to 256QAM, (Case 1-1, Case 0) may be mapped to 64QAM, (Case 0, Case 1-1) may be mapped to 16QAM, and (Case 1-1, Case 1-1) may be mapped to QPSK.

If the base station B reports the modulation scheme through the RS arrangement, the higher the modulation order, the more the RS can be arranged to an RE on which the base station A does not transmit a signal. That is, a modulation scheme of the RB may be high when Z is great.

When an RS transmitted by the base station B overlaps with a signal of the base station A, accuracy of channel estimation for an interference signal may be decreased. Since more accurate channel estimation is required in general when a modulation order is high, in order to increase accuracy of the channel estimation, it is preferable that, when the modulation order is high, the base station B transmits the RS through an empty RE, i.e., an RE on which the base station A does not transmit a signal.

However, if the base station B does not transmit a signal on all REs on which the base station A does not transmit a signal, the terminal A may determine that interference does not exist. Therefore, the base station B must transmit an RS on one or more REs among REs on which the base station A does not transmit a signal.

Meanwhile, Xn and Yn may be selected as one of predetermined quantized values. When a modulation scheme of a resource is high, the base station B may decrease Xn, and may increase Yn.

In general, when a beam width is formed to be narrow, a reception SNR is increased at a target point to which a signal is delivered, and thus the modulation order may be increased. When the modulation order is increased, it means that the reception SNR of the target point is sufficiently high, and thus a value Xn may be decreased.

If a value Yn is decreased, strength of an RS of the base station B is increased, and thus it is difficult for the terminal A to estimate its channel. Therefore, the base station B may maintain a magnitude of interference having an effect on an RS of the base station B to be less than or equal to a specific value by increasing the value Yn.

In summary, it is assumed that a beam having a first beam width is formed by using a specific RB constructed of a plurality of REs in the base station A, a beam having a second beam width less than the first beam width is formed by using the same RB by the neighboring base station B, and an RS is arranged to N REs in the RB. In this case, the base station B may arrange Z (1≤Z≤N) RSs to an RE on which the base station A does not arrange an RS, and may arrange N-Z RSs to an RE on which the base station A arranges an RS.

In this case, transmit power (RB) of the Z RSs may be X times (X>0) of a data signal, and power (RB, n) of the N-Z RSs may be 1/Y times (Y>0) of the RB.

As such, according to the present invention, provided are a reference signal processing method of a terminal capable of determining a power ratio of a reference signal corresponding to a beam width to a data signal when differential beamforming is performed on a plurality of beams, and a reference signal power control method in which a terminal can reliably receive a plurality of reference signals by adjusting a communication range of the plurality of reference signals when differential beamforming is performed.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for processing, by a terminal, a reference signal, the method comprising:
   receiving a first reference signal through a first resource block and a second reference signal through a second resource block; and
   determining a first power ratio of a reference signal to a data signal for the first reference signal and a second power ratio of a reference signal to a data signal for the second reference signal,
   wherein a first beam width for the first reference signal is determined based on an index of the first resource block, wherein a second beam width for the second reference signal is determined based on an index of the second resource block, wherein the first power ratio is determined based on the first beam width, and wherein the second power ratio is determined based on the second beam width,
   wherein if a power ratio related with a minimum beam width among the first power ratio and the second power ratio is α, a power ratio related with an m-th beam width among the first power ratio and the second power ratio $α_m$ is expressed by Equation 1:

$$α_m = α*(G(W_M,θ))^2/(G(W_m,θ))^2, \qquad \text{<Equation1>}$$

where $G(W_M,θ)$ is an antenna gain for a resource block related with the minimum beam width, $G(W_m,θ)$ is an antenna gain for a resource block related with the m-th beam width, $W_m$ is a beam forming vector of a resource block related with the m-th (1≤m≤M) beam width, M is a number of reference signals, and θ is a horizontal steering angle between the terminal and a base station.

2. The method of claim 1, wherein the first power ratio is determined based on a first table for an antenna gain related with the first beam width, and wherein the second power ratio is determined based on a second table for an antenna gain related with the second beam width.

3. The method of claim 1, wherein if M is 2, an information bit is comprised in the first resource block having a beam width, and a parity bit is comprised in the second resource block having a beam width that is narrower than the beam width the first resource block.

4. The method of claim 1, further comprising receiving information on the first beam width and the second beam width from the base station.

5. The method of claim 2, further comprising receiving information regarding the first table and the second table from the base station.

6. A terminal comprising:
   a radio frequency (RF) unit for receiving a first reference signal through a first resource block and a second reference signal through a second resource block; and
   a processor for determining a first power ratio of a reference signal to a data signal for the first reference signal and a second power ratio of a reference signal to a data signal for the second reference signal,
   wherein a first beam width for the first reference signal is determined based on an index of the first resource block, wherein a second beam width for the second reference signal is determined based on an index of the second resource block, wherein the first power ratio is determined based on the first beam width, and wherein the second power ratio is determined based on the second beam width,
   wherein if a power ratio related with a minimum beam width among the first power ratio and the second power ratio is α, a power ratio related with an m-th beam width among the first power ratio and the second power ratio $α_m$ is expressed by Equation 1:

$$α_m = α*(G(W_M,θ))^2/(G(W_m,θ))^2, \qquad \text{<Equation1>}$$

where $G(W_M,θ)$ is an antenna gain for a resource block related with the minimum beam width, $G(W_m,θ)$ is an antenna gain for a resource block related with the m-th beam width, $W_m$ is a beam forming vector of a resource block related with the m-th (1≤m≤M) beam width, M is a number of reference signals, and θ is a horizontal steering angle between the terminal and a base station.

7. The terminal of claim 6, wherein the first power ratio is determined based on a first table for an antenna gain related with the first beam width, and wherein the second power ratio is determined based on a second table for an antenna gain related with the second beam width.

8. The terminal of claim 6, wherein the RF unit further receives information on the first beam width and the second beam width.

9. The terminal of claim 7, wherein the RF unit further receives information regarding the first table and the second table.

10. A method of controlling power of a reference signal, the method comprising:
   transmitting a first reference signal through a first resource block and a second reference signal through a second resource block;
   compensating for transmit power of the first reference signal by considering an antenna horizontal steering angle with respect to a terminal for receiving the first reference signal; and
   compensating for transmit power of the second reference signal by considering an antenna horizontal steering angle with respect to a terminal for receiving the second reference signal,
   wherein a first beam width for the first reference signal is determined based on an index of the first resource block, wherein a second beam width for the second reference signal is determined based on an index of the second resource block, wherein a first power ratio of a reference signal to a data signal for the first reference signal is determined based on the first beam width, and wherein a second power ratio of a reference signal to a data signal for the second reference signal is determined based on the second beam width,
   wherein if transmit power of a reference signal related with a minimum beam width is $P_T(M)$, transmit power of an m-th ($1 \leq m \leq M$) reference signal $P_T(m)$ is expressed by Equation 2:

$$P_T(m)=P_T(M)*G(W_M,\theta)/G(W_m,\theta), \quad \text{<Equation 2>}$$

where $G(W_M,\theta)$ is an antenna gain for a resource block related with the minimum beam width, and $G(W_m,\theta)$ is an antenna gain for a resource block related with an m-th ($1 \leq m \leq M$) beam width, $W_m$ is a beam forming vector of a resource block related with the m-th ($1 < m < M$) beam width, M is a number of reference signals, and $\theta$ is a horizontal steering angle between the terminal and a base station.

11. The method of claim 10, wherein the first power ratio is determined based on a first table for an antenna gain related with the first beam width, and wherein the second power ratio is determined based on a second table for an antenna gain related with the second beam width.

* * * * *